Feb. 28, 1939.  C. A. MICHEL ET AL  2,148,635
HEADLAMP CONSTRUCTION
Filed March 25, 1937   2 Sheets-Sheet 1
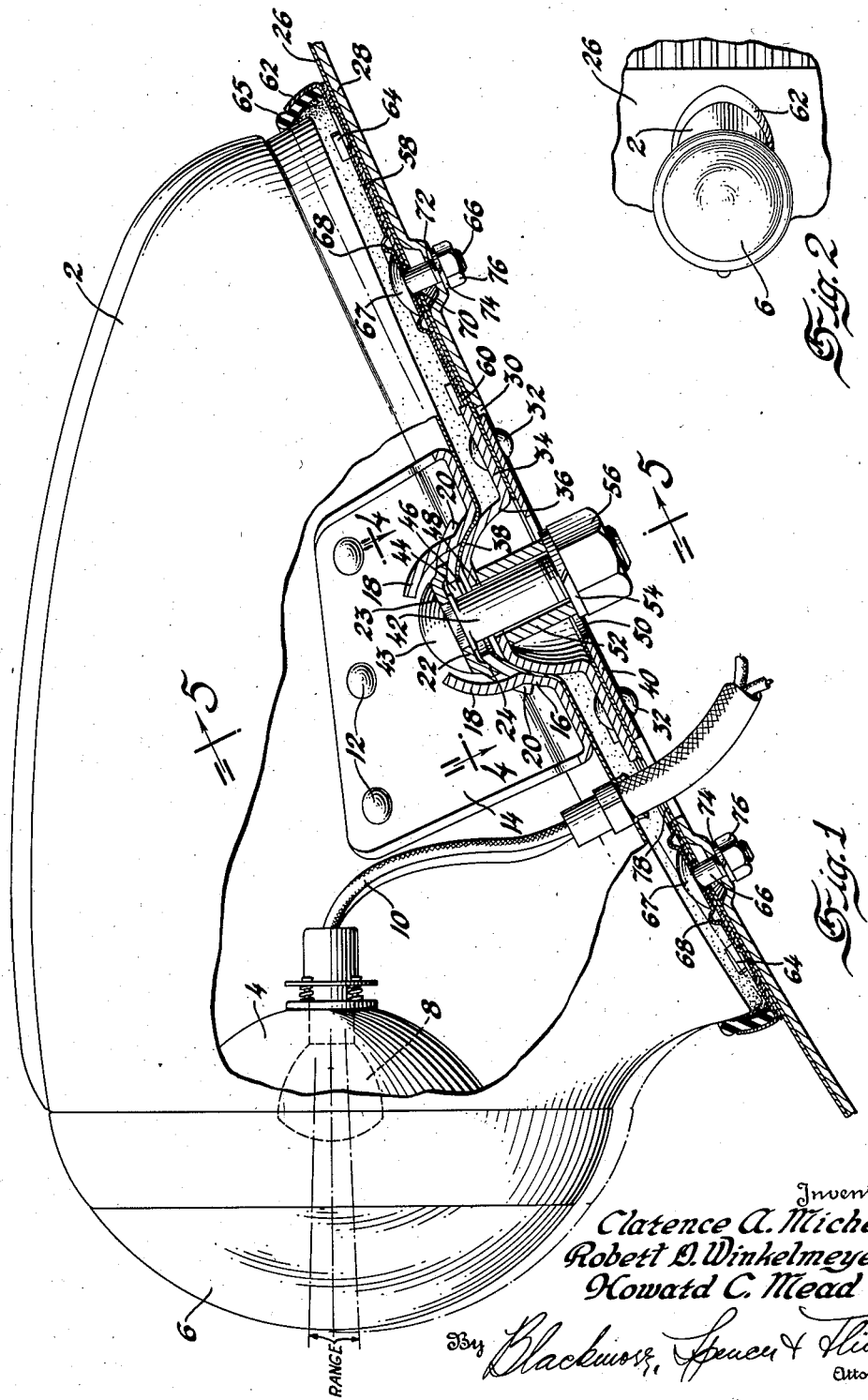
Inventors
Clarence A. Michel,
Robert D. Winkelmeyer &
Howard C. Mead
By Blackmore, Spencer & Flint
Attorneys Feb. 28, 1939.  C. A. MICHEL ET AL  2,148,635
HEADLAMP CONSTRUCTION
Filed March 25, 1937     2 Sheets-Sheet 2
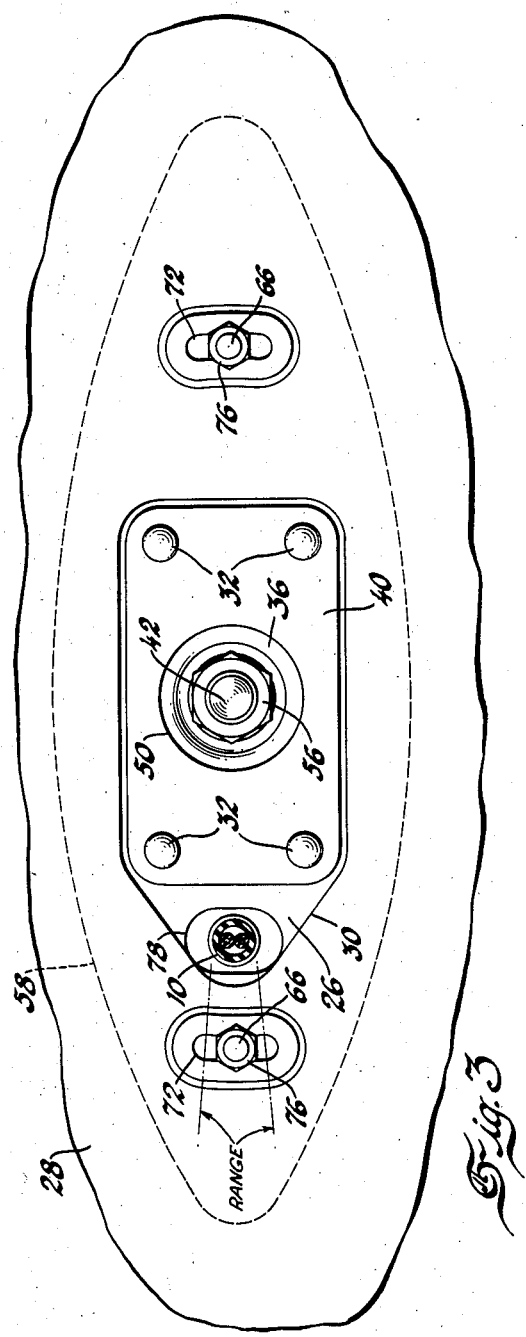
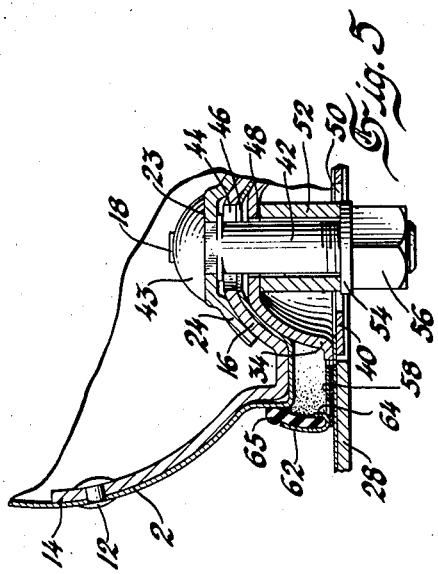
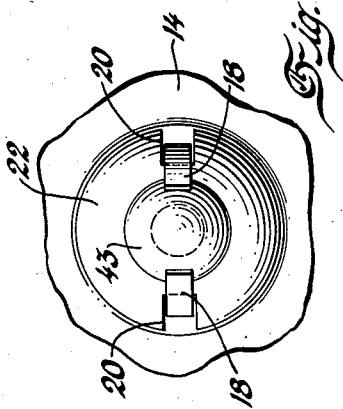
Inventors
Clarence A. Michel,
Robert D. Winkelmeyer &
Howard C. Mead
By Blackmore, Spencer & Flint
Attorneys Patented Feb. 28, 1939

2,148,635

UNITED STATES PATENT OFFICE 2,148,635

HEADLAMP CONSTRUCTION

Clarence A. Michel, Robert D. Winkelmeyer, and Howard C. Mead, Anderson, Ind., assignors to General Motors Corporation, Detroit, Mich., a corporation of Delaware Application March 25, 1937, Serial No. 132,938

7 Claims. (Cl. 248—274)

This invention relates to a lamp construction and more particularly to a means for supporting a headlamp whereby the beam of light may be readily adjusted.

As a practical matter, it is essential that a means be provided to adjust the beam of light projected from headlamps for vehicles and the like, whereby the beam may be raised or lowered and also moved in a lateral direction. This invention relates to improvements in such adjusting means. Accordingly, the primary object of this invention is to provide a lamp construction having improved means to adjust the lamp casing in order to alter the point at which the beam of light strikes the surface to be illuminated.

Another object of this invention is to provide a means to easily and quickly adjust a lamp casing in two planes substantially at right angles to each other.

It is also an object of this invention to provide a headlamp adjusting means that is economical to manufacture and assemble, but, at the same time, one in which the several parts are securely held in a desired position of adjustment.

A further object of this invention is the provision of a vehicle headlamp construction in which the lamp casing may be easily and quickly moved to, and secured in, a desired position, the adjustment means being largely concealed and the whole assembly one of pleasing appearance.

Other objects and advantages reside in the combination and arrangement of parts as will become more apparent as the description proceeds.

Reference is herein made to the drawings forming a portion of this specification, in which:

Figure 1 is a view with parts in section showing a headlamp casing and means for supporting the same.

Figure 2 is a view showing a headlamp mounted on the side of a vehicle radiator shell.

Figure 3 is a bottom plan view of the construction shown in Figure 1.

Figure 4 is a view on line 4—4 in Figure 1.

Figure 5 is a sectional view substantially on line 5—5 in Figure 1.

In the drawings, 2 is a headlamp casing having a reflector 4 secured thereto. A transparent lens 6 is secured to the casing and is adapted to transmit a beam of light from the lamp bulb 8 secured to the reflector. Suitable electrical connections 10 lead to the vehicle wiring.

Secured to the casing, as by means of rivets 12, is a reinforcing plate 14 having a generally semi-spherical shell portion 16 in which are cutout tongues 18. The latter fit within slots 20 formed in the curved portion 24 of a washer 22, said curved portion contacting a portion of the curved portion 16 of the reinforcing plate. The tongues will move with respect to the slots during adjustment of the casing in the plane of the tongues and slots.

Secured to the side of the radiator shell 26 is a backing plate 28 having an opening 30 therein adjacent the reinforcing plate 14 for the lamp casing. Secured to the radiator shell, as by means of rivets 32, at the opening 30 is a bracket 34 having a generally semi-spherical portion 36 which contacts one side of a curved portion 38 of the lamp casing, the other side of which contacts the curved portion 16 of the reinforcing plate. The rivets 32 also secure a support 40 to the side of the radiator shell opposite that of the bracket 34. A bolt 42, fixed to the washer 22, has its head 43 contacting a flat portion 23 of the washer. The bolt 42 passes through aligned openings 44, 46, 48 and 50 formed in the reinforcing plate 14, lamp casing 2, bracket 34 and support 40, respectively. A sleeve 52 loosely surrounds a portion of the bolt and contacts the curved portion of bracket 34. By means of a washer 54 and a nut 56, the sleeve 52 is tightly clamped against the bracket 34 and the casing is held in fixed relation thereto.

Adjustably secured to the side of the radiator shell is a member 58 having a centrally disposed opening 60 therein and a flange 62. Preferably the member 58 is formed of sheet metal and bent-up tangs 64 formed therein secure a rubber or other suitable resilient strip or molding 65 to the flange 62. The shape of the flange and molding is such that it conforms to the shape of the headlamp casing, one side of the casing fitting within the molding and flange as indicated and closely contacting the resilient molding. Member 58 is secured to the radiator shell and backing member 28 by means of two bolts 66, one on either side of the bolt 42, the heads 67 of the bolts 66 fitting within circular pressed-up beads 68 formed in member 58. The bolts pass through suitable elongated slots 70 and 72 formed in the radiator and backing member, respectively. By means of the lock washers 74 and nuts 76 the member 58 may be securely clamped in position. A slot 78 is formed in the side of the radiator shell within which is the lead 10 from the lamp bulb to the car wiring. The slot is of a size sufficient to accommodate the lead in any adjusted position of the lamp casing.

In order to adjust the lamp casing in a horizontal plane and shift the beam of light laterally to the right or left it is only necessary to unloosen the nut 56 and tilt the casing about the curved portion 36 of bracket 34. This movement may take place while the bolts 66 are in clamped position. The rubber molding is of a width sufficient to enclose the space between the headlamp casing and radiator shell within the limits of the range of adjustment. If desired to move the lamp casing in a vertical plane to raise or lower the headlamp beam the nuts 76 will be loosened, as well as the nut 56, and the casing moved with member 58 and molding to a new position, the bolts 66 moving within the slots 72 and 70, as will be readily understood. Tightening the nuts 56 and 76 secures the parts in adjusted position. The molding encloses the space between the lamp casing and the radiator shell and conceals the parts enclosed therein. The several bolt heads, lock washers and nuts of the adjusting means are on the inner side of the radiator shell where they are normally out of sight. The rubber molding snugly contacts the lamp casing and helps to support the lamp casing.

While the invention has been described in connection with headlamps supported by the side of the radiator shell and has certain advantages when used in this manner, it will be understood that the invention is not so limited and may be used in supporting lamps from any desired part of the vehicle. In fact, the invention may be used in adjustably supporting lamps of any kind, whether on a vehicle or not.

Various changes and modifications may be made in the embodiment of our invention shown and described without departing from the spirit of our invention and we do not wish to limit the patent granted thereon other than as necessitated by the prior art.

We claim:

1. In a lamp construction, a support, a casing spaced from said support, a flanged member, a resilient molding within the flange and fixed thereto surrounding a portion of said casing and in contact therewith, means for adjustably securing the flanged member and molding in desired positions to thereby hold the casing in desired positions of adjustment and means for adjustably securing the casing within the resilient molding.

2. In a lamp construction, a support, a lamp casing spaced from said support and having a curved portion, a flanged member, a resilient molding within the flange surrounding a portion of said casing and in contact therewith, means for adjustably securing the flanged member and molding in desired positions of adjustment to thereby hold the casing in desired positions of adjustment and means for adjustably securing the casing within the resilient molding comprising a member fixed to the support and having a curved portion contacting the curved portion of the casing and means to clamp or unclamp the contacting curved portions.

3. In a lamp construction, a support, a lamp casing having a curved portion, a backing member secured to the casing having a curved portion which conforms to the curved portion of the casing, a bracket secured to the support and having a generally semi-spherical portion contacting one side of the curved portion of the casing, a member having a flange, a rubber molding secured to the flange and snugly engaging the lamp casing, means for adjustably securing the flanged member to the support and means for adjustably clamping the curved portions of the bracket and casing.

4. In a lamp construction, a support having slots therein, a bracket fixed to the support and having a curved portion, a lamp casing having a curved portion contacting the curved portion of the bracket, a backing member secured to the lamp casing having a curved portion supporting the curved portion of the lamp casing and having tongue portions, a washer having a curved surface contacting the curved portion of the bracket and having slots formed therein, said tongues extending into the slots, a bolt for securing the washer, backing member, lamp casing and bracket in a desired position of adjustment, a member having a flange, the periphery of which surrounds a portion of the lamp casing, a resilient gasket secured to the member between the casing and the flange and snugly contacting the lamp casing, and means connected to the flanged member movable within the slots in the support for adjustably securing the flanged member to the support.

5. In a lamp construction, a support, a lamp casing spaced therefrom, means for adjustably connecting the lamp casing and support, means comprising a resilient molding having a portion thereof contacting the periphery of the casing for closing the space between the support and casing and means for adjustably securing the lamp casing and molding in desired positions of adjustment.

6. In a lamp construction, a support, a casing spaced from the support, a resilient molding shaped to conform to the periphery of one side of the lamp casing and having a portion contacting the same, said molding enclosing the space between the casing and support, and means for adjustably securing the casing and molding in desired positions of adjustment.

7. In a lamp construction, a support, a casing spaced from said support, a resilient molding surrounding a portion of said casing and in contact therewith, means for adjustably securing the molding to the support to thereby fix the casing in desired positions of adjustment and means for adjustably securing the casing in desired positions within the resilient molding.

CLARENCE A. MICHEL.
ROBERT D. WINKELMEYER.
HOWARD C. MEAD.